(12) United States Patent
Luo et al.

(10) Patent No.: US 10,271,239 B2
(45) Date of Patent: Apr. 23, 2019

(54) METHOD AND SYSTEM FOR REOPTIMIZING UNMANNED AERIAL VEHICLE FORMATION COMMUNICATION TOPOLOGY BASED ON MINIMUM COST ARBORESCENCE

(71) Applicant: Hefei University of Technology, Anhui Province (CN)

(72) Inventors: He Luo, Anhui Province (CN); Guoqiang Wang, Anhui Province (CN); Xiaoxuan Hu, Anhui Province (CN); Huawei Ma, Anhui Province (CN); Peng Jin, Anhui Province (CN); Wei Xia, Anhui Province (CN)

(73) Assignee: Hefei University of Technology, Anhui (CN)

( * ) Notice: Subject to any disclaimer, the term of this patent is extended or adjusted under 35 U.S.C. 154(b) by 0 days.

(21) Appl. No.: 15/608,571

(22) Filed: May 30, 2017

(65) Prior Publication Data

US 2017/0347285 A1 Nov. 30, 2017

(30) Foreign Application Priority Data

May 27, 2016 (CN) .......................... 2016 1 0383787

(51) Int. Cl.
*G08G 5/00* (2006.01)
*G08G 5/04* (2006.01)
(Continued)

(52) U.S. Cl.
CPC ......... *H04W 28/021* (2013.01); *B64C 39/024* (2013.01); *G08G 5/0008* (2013.01);
(Continued)

(58) Field of Classification Search
None
See application file for complete search history.

(56) References Cited

U.S. PATENT DOCUMENTS 9,924,441 B1* 3/2018 Barritt ................. H04W 40/246
2006/0211413 A1* 9/2006 Ariyur .................. H04W 16/18
455/423
2017/0269612 A1* 9/2017 Frolov .................... G05D 1/104

FOREIGN PATENT DOCUMENTS

CN 101286071 A 10/2008
CN 102347991 A 2/2012
(Continued)

OTHER PUBLICATIONS

Office Action issued by the State Intellectual Property Office of the People's Republic of China dated Nov. 8, 2016.
(Continued)

*Primary Examiner* — Noel R Beharry
*Assistant Examiner* — Richard Schnell
(74) *Attorney, Agent, or Firm* — Wayne & Ken, LLC; Tony Hom (57) ABSTRACT

A method and a system for reoptimizing unmanned aerial vehicle formation communication topology based on minimum cost arborescence are used for optimizing reconstructed UAV formation communication topology after a communication failure occurs on the UAVs in the formation. The method includes calculating a first communication cost of the reconstructed UAV formation communication topology; comparing the first communication cost with a target communication cost for the minimum cost arborescence of the formation communication diagram under a predetermined state; when the first communication cost is greater than the target communication cost for the minimum cost arborescence of the formation communication diagram under the predetermined state, optimizing the reconstructed UAV formation communication topology through a predetermined strategy.

8 Claims, 3 Drawing Sheets

(51) Int. Cl.
  *B64C 39/02* (2006.01)
  *H04W 28/02* (2009.01)
  *H04W 40/00* (2009.01)
  *H04W 84/18* (2009.01)
(52) U.S. Cl.
  CPC ......... *G08G 5/0052* (2013.01); *G08G 5/0069* (2013.01); *G08G 5/045* (2013.01); *B64C 2201/143* (2013.01); *H04W 40/00* (2013.01); *H04W 84/18* (2013.01)

(56) References Cited

FOREIGN PATENT DOCUMENTS

| | | |
|---|---|---|
| CN | 105353766 A | 2/2016 |
| WO | WO2007080584 A3 | 7/2007 |

OTHER PUBLICATIONS

Office Action issued by the State Intellectual Property Office of the People's Republic of China dated Jan. 22, 2017.

\* cited by examiner

मेथड AND SYSTEM FOR REOPTIMIZING UNMANNED AERIAL VEHICLE FORMATION COMMUNICATION TOPOLOGY BASED ON MINIMUM COST ARBORESCENCE

CROSS-REFERENCE TO RELATED APPLICATIONS

The present application claims priority of Chinese Patent Application No. 201610383787.3, filed on May 27, 2016, which is herein incorporated by reference in its entirety.

TECHNICAL FIELD

The present disclosure relates to the field of unmanned aerial vehicle communication technology, and particularly to a method and system for reoptimizing unmanned aerial vehicle formation communication topology based on minimum cost arborescence.

BACKGROUND

In the prior art, when a communication failure occurs on the unmanned aerial vehicle (UAV), it is usually to realize fast communication topology reconstruction by reconstructing communication topology so as to avoid the UAV collision accidents and to restore the formation shape.

After a fast communication topology reconstruction, all the UAVs will be secure, although some of the UAVs may have left the formation (they are flying along with the predetermined reference track at a different altitude or flying back to the airport to which they belong on their own), and the remaining UAVs keep flying to the target area in the formation. However, the communication cost of the formation corresponding to the reconstructed communication topology is not always optimal, thus it is necessary to reoptimize the communication topology so as to minimize the communication cost of the formation and to continually maintain the formation shape by UAV position reconstruction (exchange the positions of the UAVs in the formation shape, or fill up the vacancy of the UAV left the formation with another UAV).

SUMMARY

For the defects in the prior art, the present disclosure provides a method and a system for reoptimizing unmanned aerial vehicle formation communication topology based on minimum cost arborescence, guaranteeing that the optimal communication topology will be obtained by UAV position reconstruction.

On the one hand, the present disclosure provides a method for reoptimizing unmanned aerial vehicle formation communication topology based on minimum cost arborescence, it is used for optimizing reconstructed UAV formation communication topology after a communication failure occurs on the UAVs in the formation, the method comprises:

calculating a first communication cost of the reconstructed UAV formation communication topology;

comparing the first communication cost with a target communication cost for the minimum cost arborescence of the formation communication diagram under a predetermined state;

optimizing the reconstructed UAV formation communication topology through a predetermined strategy, when the first communication cost is greater than the target communication cost for the minimum cost arborescence of the formation communication diagram under the predetermined state.

Optionally, optimizing the reconstructed UAV formation communication topology through the predetermined strategy comprises:

exchanging the positions of the UAVs in the formation communication diagram for multiple times, obtaining a second communication cost for the minimum cost arborescence of the formation communication diagram in which the positions have been exchanged for multiple times;

taking the formation communication topology corresponding to the second communication cost, as the reoptimized UAV formation communication topology;

Wherein, the second communication cost is the minimum communication cost for the minimum cost arborescence of the formation communication diagram in which the positions have been exchanged for multiple times.

Optionally, exchanging the positions of the UAVs in the formation communication diagram for multiple times, obtaining a second communication cost for the minimum cost arborescence of the formation communication diagram in which the positions have been exchanged for multiple times comprise:

taking the first communication cost as the initial value of the second communication cost;

exchanging the positions of the UAVs in the formation communication diagram for the first time, obtaining a third communication cost;

taking the third communication cost as the optimizing value of the second communication cost, if the third communication cost is smaller than the initial value of the second communication cost;

exchanging the positions of the UAVs in the formation communication diagram firstly exchanged for the second time, obtaining a fourth communication cost;

taking the fourth communication cost as the optimizing value of the second communication cost, if the fourth communication cost is smaller than the optimizing value of the second communication cost;

exchanging the positions of the UAVs in the formation communication diagram secondly exchanged for the Nth time, obtaining a fifth communication cost;

taking the fifth communication cost as the optimizing value of the second communication cost, if the fifth communication cost is smaller than the optimizing value of the second communication cost.

Optionally, exchanging the positions of the UAVs in the formation communication diagram for multiple times, obtaining a second communication cost for the minimum cost arborescence of the formation communication diagram in which the positions have been exchanged for multiple times comprise:

comparing the exchange times and exchange distances for the UAV positions of the UAV formation communication topologies corresponding to the fifth communication cost and to the optimizing value of the second communication cost with respect to the reconstructed UAV formation communication topology respectively, if the fifth communication cost is equal to the optimizing value of the second communication cost;

taking the fifth communication cost as the optimizing value of the second communication cost, if the exchange times and exchange distances for the UAV positions of the UAV formation communication topology corresponding to the fifth communication cost are smaller.

Optionally, the formation communication diagram under the predetermined state is: any one of the UAVs in the communication diagram may be the formation leader and all the UAVs communicate normally with each other.

On the other hand, the present disclosure also provides a system for reoptimizing unmanned aerial vehicle formation communication topology based on minimum cost arborescence, which is used for optimizing reconstructed UAV formation communication topology after a communication failure occurs on the UAVs in the formation, the system comprises:

calculating module, for calculating a first communication cost of the reconstructed UAV formation communication topology;

comparing module, for comparing the first communication cost with a target communication cost for the minimum cost arborescence of the formation communication diagram under a predetermined state;

optimizing module, for optimizing the reconstructed UAV formation communication topology through a predetermined strategy, when the first communication cost is greater than the target communication cost for the minimum cost arborescence of the formation communication diagram under the predetermined state.

Optionally, the optimizing module is used for:

exchanging the positions of the UAVs in the formation communication diagram for multiple times, obtaining a second communication cost for the minimum cost arborescence of the formation communication diagram in which the positions have been exchanged for multiple times;

taking the formation communication topology corresponding to the second communication cost, as the reoptimized UAV formation communication topology;

Wherein, the second communication cost is the minimum communication cost for the minimum cost arborescence of the formation communication diagram in which the positions have been exchanged for multiple times.

Optionally, the optimizing module is specifically used for:

taking the first communication cost as the initial value of the second communication cost;

exchanging the positions of the UAVs in the formation communication diagram for the first time, obtaining a third communication cost;

taking the third communication cost as the optimizing value of the second communication cost if the third communication cost is smaller than the initial value of the second communication cost;

exchanging the positions of the UAVs in the formation communication diagram firstly exchanged for the second time, obtaining a fourth communication cost;

taking the fourth communication cost as the optimizing value of the second communication cost if the fourth communication cost is smaller than the optimizing value of the second communication cost;

exchanging the positions of the UAVs in the formation communication diagram secondly exchanged for the Nth time, obtaining a fifth communication cost;

taking the fifth communication cost as the optimizing value of the second communication cost if the fifth communication cost is smaller than the optimizing value of the second communication cost.

Optionally, the optimizing module is specifically used for:

comparing the exchange times and exchange distances for the UAV positions of the UAV formation communication topologies corresponding to the fifth communication cost and to the optimizing value of the second communication cost with respect to the reconstructed UAV formation communication topology respectively, if the fifth communication cost is equal to the optimizing value of the second communication cost;

taking the fifth communication cost as the optimizing value of the second communication cost, if the exchange times and exchange distances for the UAV positions of the UAV formation communication topology corresponding to the fifth communication cost are smaller;

Optionally, the formation communication diagram under the predetermined state is: any one of the UAVs in the communication diagram may be the formation leader and all the UAVs communicate normally with each other.

It can be known from the technical solutions described above that, by comparing the first communication cost of the reconstructed UAV formation communication topology with the target communication cost, and by optimizing the reconstructed UAV formation communication topology through predetermined strategy when the first communication cost is greater than the target communication cost, the method and system for reoptimizing unmanned aerial vehicle formation communication topology based on minimum cost arborescence provided by the present disclosure, minimize the communication cost of the reoptimized UAV formation communication topology when communication failure occurs on the UAVs in the formation.

BRIEF DESCRIPTION OF THE DRAWINGS

A brief description of the drawings required by the embodiments or the prior art depiction will be made hereinafter, so as to more clearly illustrate the embodiments of the present disclosure or the technical solutions in the prior art. Obviously, the accompanying drawings in the following description are only some embodiments of the present disclosure. For those of ordinary skills in the art, it is possible to obtain other accompanying drawings on the basis of these drawings without creative work.

DETAILED DESCRIPTION

The technical solutions in the embodiments of the present disclosure will be described clearly and completely hereinafter with reference to the accompanying drawings for the embodiments of the present disclosure. It is obvious that the described embodiments are not all but only part of the embodiments of the present disclosure. Based on the embodiments in the present disclosure, all other embodiments obtained by those of ordinary skills in the art without creative work are within the scope of the present disclosure.

Figure 1:
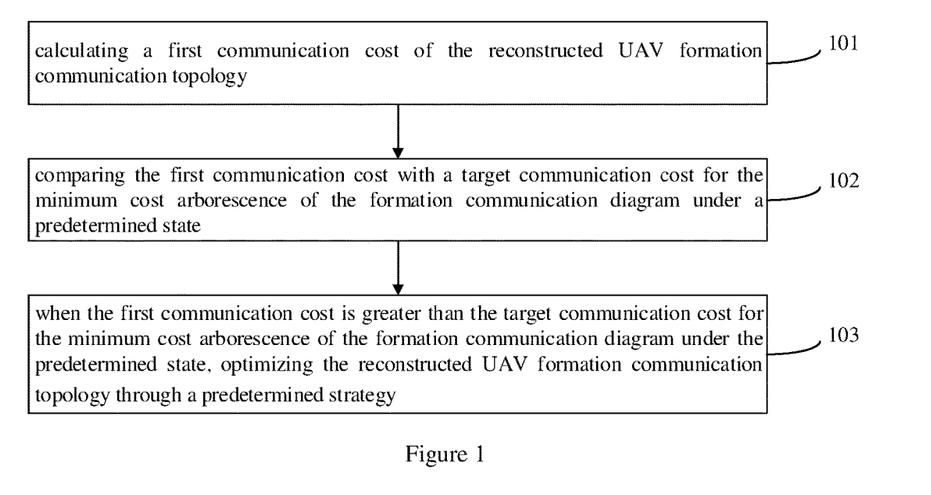
FIG. 1 is a flow chart illustrating a method and system for reoptimizing unmanned aerial vehicle formation communication topology based on minimum cost arborescence in accordance with an embodiment of the present disclosure.

FIG. 1 illustrates the flow chart of the method for reoptimizing unmanned aerial vehicle formation communication topology based on minimum cost arborescence provided by an embodiment of the present disclosure. The method is used for optimizing the reconstructed UAV formation communication topology after a communication failure occurs on the UAV in the formation, the method comprises:

Step 101, calculating a first communication cost of the reconstructed UAV formation communication topology;

Step 102, comparing the first communication cost with a target communication cost for the minimum cost arborescence of the formation communication diagram under a predetermined state;

It can be understood that the formation communication diagram under the predetermined state is: any one of the UAVs in the communication diagram may be the formation leader and all the UAVs communicate normally with each other.

Step 103, when the first communication cost is greater than the target communication cost for the minimum cost arborescence of the formation communication diagram under the predetermined state, optimizing the reconstructed UAV formation communication topology through a predetermined strategy, which comprises:

Step 1031, exchanging the positions of the UAVs in the formation communication diagram for multiple times, obtaining a second communication cost for the minimum cost arborescence of the formation communication diagram in which the positions have been exchanged for multiple times.

In detail, exchanging the positions of the UAVs in the formation communication diagram for multiple times, obtaining a second communication cost for the minimum cost arborescence of the formation communication diagram in which the positions have been exchanged for multiple times in step 1031 comprise:

taking the first communication cost as the initial value of the second communication cost;

exchanging the positions of the UAVs in the formation communication diagram for the first time, obtaining a third communication cost;

if the third communication cost is smaller than the initial value of the second communication cost, taking the third communication cost as the optimizing value of the second communication cost;

exchanging the positions of the UAVs in the formation communication diagram firstly exchanged for the second time, obtaining a fourth communication cost;

if the fourth communication cost is smaller than the optimizing value of the second communication cost, taking the fourth communication cost as the optimizing value of the second communication cost;

exchanging the positions of the UAVs in the formation communication diagram secondly exchanged for the Nth time, obtaining a fifth communication cost;

if the fifth communication cost is smaller than the optimizing value of the second communication cost, taking the fifth communication cost as the optimizing value of the second communication cost.

In another achievable way, exchanging the positions of the UAVs in the formation communication diagram for multiple times, obtaining a second communication cost for the minimum cost arborescence of the formation communication diagram in which the positions have been exchanged for multiple times in step 1031 comprise:

if the fifth communication cost is equal to the optimizing value of the second communication cost, comparing the exchange times and exchange distances for the UAV positions of the UAV formation communication topologies corresponding to the fifth communication cost and to the optimizing value of the second communication cost with respect to the reconstructed UAV formation communication topology respectively.

if the exchange times and exchange distances for the UAV positions of the UAV formation communication topology corresponding to the fifth communication cost are smaller, taking the fifth communication cost as the optimizing value of the second communication cost.

Step 1032, taking the formation communication topology corresponding to the second communication cost, as the reoptimized UAV formation communication topology;

Wherein, the second communication cost is the minimum communication cost for the minimum cost arborescence of the formation communication diagram in which the positions have been exchanged for multiple times.

By comparing the first communication cost of the reconstructed UAV formation communication topology with the target communication cost, and by optimizing the reconstructed UAV formation communication topology through predetermined strategy when the first communication cost is greater than the target communication cost, the method described above minimizes the communication cost of the reoptimized UAV formation communication topology when communication failure occurs on the UAVs in the formation.

Before a detailed description of the method described above, a description will be made first regarding the formation control methods of UAV forming and maintaining the formation shape, and the formation communication topology.

There are mainly four formation control methods of UAV forming and maintaining the formation shape: leader-follower strategy, virtual structure strategy, behavioral strategy, and consensus-based strategy. Wherein, the leader-follower strategy is the most mature one, the basic idea thereof is that, there is only one UAV in the formation as the formation leader flying according to a predetermined formation reference track; the rest of the UAVs are as the follower following the formation leader directly or indirectly, for example, a UAV may follow the formation leader directly, or may follow another UAV that follows the formation leader directly or indirectly. If the ith UAV $UAV_i$ directly follows the jth UAV $UAV_j$, $UAV_i$ is referred to as the follower of $UAV_j$ and $UAV_j$ is referred to as the leader of $UAV_i$. $UAV_j$ will send its position, speed and direction information to the $UAV_i$ through a point-to-point communication link every $T_{control}$ seconds. After $UAV_i$ receives these information, it will accordingly adjust its own speed and direction to realize maintenance of an expected relative position between itself and $UAV_j$. When all UAVs can realize maintenance of expected relative positions between themselves and the leader, maintenance of the formation shape is realized. It is assumed that n UAVs use the leader-follower strategy to form and maintain a formation shape S, n positions in S are numbered $\{1, 2, \ldots, n\}$, each UAV can be located in any position in S, a few UAVs but not all UAVs can be used as the formation leader (these UAVs are also referred to as candidate formation leaders), each UAV can exchange information with any other UAV through a point-to-point communication link, and communication cost of each communication link is determined by its corresponding communication distance. Therefore, a weighted directed graph G=(V, E, W, P) can be used to represent all available communication links between UAVs in the formation, referred to as a formation communication diagram.

(1) V={$v_i$}, 1≤i≤n is a set of nodes in the diagram, where $v_i$ represents the ith UAV $UAV_i$.

(2) E={$e_{ij}$} ⊂ V×V, 1≤j≤n is a set of edges in the diagram, where $e_{ij}$ represents there is an available communication link from $UAV_i$ to $UAV_j$, thereby enabling $UAV_i$ to send information to $UAV_j$, that is, $UAV_i$ can be the leader of $UAV_j$.

(3) W={$w(e_{ij})$}, $e_{ij} \in E$ is a set of weight for each edge in the diagram, where $w(e_{ij})$ represents the communication cost of $e_{ij}$.

(4) P={$p_i$}, 1≤i≤n is a set of a specific position of each UAV in the formation shape S, referred to as UAV position configuration, where $p_i$ represents the specific position of $UAV_i$ in S.

According to the description above, it can be known that each UAV only needs to receive information from its leader and send information to its follower, which means that creation and maintenance of the formation shape can be realized without using all available communication links, wherein the set of communication links that are used is referred to as communication topology of the UAV formation and the communication links that are not used are referred to as redundant communication links. Therefore, the communication topology of the UAV formation A=(V, E*, W*, P) is a special subgraph of its formation communication diagram G=(V, E, W, P), where E* ⊂ E, W* ⊂ W. Let w(A) represents the communication cost of communication topology A, and then there is $$w(A) = \sum_{e_{ij} \in E^*} w(e_{ij}).$$

Communication topology A has the following two characteristics.

Theorem 1: the communication topology A of the UAV formation based on the leader-follower strategy has to be a spanning tree of its formation communication diagram G, but it is not necessary for a spanning tree of its formation communication diagram G to be its communication topology.

Theorem 2: the communication topology A of the UAV formation based on the leader-follower strategy has to be a spanning tree of its formation communication diagram G, and UAV represented by its root node has to be able to act as the formation leader; vice versa.

Due to reasons such as mechanical failure, external interference or so forth, communication failure may occur in one or more UAVs during formation flight so that some of the communication links in the current communication topology become unavailable, thereby resulting in UAVs cannot continue to maintain the formation shape and even leading to a UAV collision accident in serious situation. Therefore, in the prior art it is usually to realize fast communication topology reconstruction by reconstructing communication topology (select some of the redundant communication links for replacing those unavailable communication links in the original communication topology) so as to avoid the UAV collision accidents and to restore the formation shape. After a fast communication topology reconstruction, all the UAVs will be secure, although some of the UAVs may have left the formation (they are flying along with the predetermined reference track at a different altitude or flying back to the airport to which they belong on their own), and the remaining UAVs keep flying to the target area in the formation. However, the communication cost of the formation corresponding to the reconstructed communication topology is not always optimal, thus it is necessary to reoptimize the communication topology so as to minimize the communication cost of the formation and to continually maintain the formation shape by UAV position reconstruction (exchange the positions of the UAVs in the formation shape, or fill up the vacancy of the UAV left the formation with another UAV).

Therefore, the present disclosure provides a distributed algorithm for reoptimizing communication topology under communication failure based on minimum arborescence, the algorithm runs in each remaining UAV in the formation. Take $UAV_i$ as an example, the basic steps of the algorithm are as shown in table 1.

TABLE 1

A algorithm for reoptimizing communication topology under communication failure

Input: With respect to the communication failure, the formation communication diagram G = (V,E,W,P) before reconstruction, the reconstructed formation communication diagram $G_r$=($V_r,E_r,W_r,P_r$), and the reconstructed communication topology $A_r$=($V_r,E_r$*,$W_r$*,$P_r$), wherein $V_r \subset V$, $P_r \subset P$, since some of the UAVs may have left the formation.
Output: The reoptimized communication topology $A_o$=($V_o,E_o,W_o,P_o$), wherein $V_o$=$V_r$.
Step 1, Let i=1, $A_o$=$A_r$ and $P_o$=$P_r$.
Step 2, Assume that all the remaining UAVs could be the formation leader and all of them could communicate with each other, construct the corresponding communication diagram $G_g$=($V_g,E_g,W_g,P_g$) thereof, wherein $V_g$=$V_r$, $P_g$=$P_r$, calculate the minimum arborescence $A_g$ of $G_g$, therefore $w(A_g)$ must be the minimum value of all the possible formation communication costs.
Step 3, If $w(A_o)$=$w(A_g)$, then reoptimizating the communication topology is not necessary, proceed directly to Step 10.

Step 4, Let i=i+1. If i ≥ $\frac{|V|!}{(|V|-|V_r|)!}$, proceed to Step 10.

Step 5, Obtain the next unused UAV position configuration $P_n$, replace the $P_r$ in $G_r$ with $P_n$ so as to obtain a new formation communication diagram $G_n$=($V_n,E_n,W_n,P_n$), wherein $V_n$=$V_r$.
Step 6, Add $VL(v_0)$ and the corresponding outgoing edges thereof in $G_n$=($V_n,E_n,W_n,P_n$) so as to construct a new formation communication diagram $G_n'$=($V_n',E_n',W_n',P_n'$).
Step 7, Calculate the minimum arborescence $A_n'$ of $G_n'$.
Step 8, If $A_n'$ does not exist or there is more than one outgoing edge of $v_0$ in $A_n'$, proceed to Step 4, otherwise proceed to Step 9.
Step 9, Delete $v_0$ and the only outgoing edge thereof in $A_n'$. If the one of the conditions below is satisfied, let $P_o$= $P_n$, $A_o$=$A_n$. Then proceed to Step 4.
(1) $w(A_n)$<$w(A_o)$.
(2) $w(A_n)$=$w(A_o)$, but the exchange times for positions of the UAVs needed by the transition from $P_r$ to $P_n$ are smaller than that of the UAVs needed by the transition from $P_r$ to $P_o$.
(3) $w(A_n)$=$w(A_o)$, and the exchange times for positions of the UAVs needed by the transition from $P_r$ to $P_n$ are equal to that of the UAVs needed by the transition from $P_r$ to $P_o$, but the exchange distances for positions of the UAVs needed by the transition from $P_r$ to $P_n$ are smaller than that of the UAVs needed by the transition from $P_r$ to $P_o$.
Step 10, $A_o$ is the reoptimized communication topology, wherein $P_o$ is the reoptimized UAV position configuration.

The reconstructed formation communication diagram $G_r$=($V_r$, $E_r$, $W_r$, $P_r$) in the algorithm is obtained by modifying the original formation communication diagram G=(V, E, W, P) according to the type of communication failure. In addition to the four communication failures considered in the prior art, two other communication failures are taken into consideration: broadcast transmitter failure and broadcast receiver failure. All six types of communication failures are shown in Table 2.

TABLE 2

| Type of communication failure | Description |
| --- | --- |
| Link interrupt | When a link interrupt occurs in $e_{ij}$, $UAV_j$ cannot receive any information sent by $UAV_i$ through point-to-point communication, but both of the unicast transmitter of $UAV_i$ and the unicast receiver of the $UAV_j$ work normally. |
| Unicast transmitter failure | When a unicast transmitter failure occurs in $UAV_i$, $UAV_i$ cannot send any information to other UAVs through point-to-point communication. |
| Unicast receiver failure | When a unicast receiver failure occurs in $UAV_i$, $UAV_i$ cannot receive any information sent by other UAVs through point-to-point communication. |
| Unicast transceiver failure | When a unicast transceiver failure occurs in $UAV_i$, $UAV_i$ can neither send any information to other UAVs through point-to-point communication, nor receive any information sent by other UAVs through point-to-point communication. |
| Broadcast transmitter failure | When a broadcast transmitter failure occurs in $UAV_i$, $UAV_i$ cannot send its own status or communication failure information to other UAVs through BC. |
| Broadcast receiver failure | When a broadcast receiver failure occurs in $UAV_i$, $UAV_i$ cannot receive status or communication failure information sent by other UAVs through BC. |

With respect to these six kinds of communication failures, in order to ensure that all UAVs receive consistent communication failure information in time, it is assumed that all UAVs have the same communication failure diagnosis strategy as described below:

(1) When any communication failure in a unicast transmitter failure, a unicast receiver failure, a unicast transceiver failure or a broadcast receiver failure occurs in $UAV_i$, $UAV_i$ itself can detect this failure, and $UAV_i$ will record the timestamp at which this failure occurred and inform other UAVs of the failure and corresponding timestamp information through BC.

(2) When a broadcast transmitter failure occurs in $UAV_i$, $UAV_i$ itself can detect this failure but cannot notify other UAVs through BC. After $T_{active}$ seconds, since other UAVs cannot receive status reported by $UAV_i$, they will determine that a broadcast transmitter failure occurs in $UAV_i$ and record timestamp at which the failure occurred.

(3) When a link interrupt occurs in $e_{ij}$ and $UAV_i$ is the leader of $UAV_j$, $UAV_j$ cannot receive position, speed and direction information sent by $UAV_i$. After $T_{active}$ seconds, if $UAV_j$ itself does not have a unicast receiver failure and does not receive unicast transmitter failure information of the $UAV_i$ through BC, $UAV_j$ will determine that a link interrupt occurs in $e_{ij}$, and $UAV_j$ will record timestamp of this failure, and then inform other UAVs of this failure and corresponding timestamp information through BC.

(4) If one UAV receives two or more communication failure information within $T_{active}$ seconds, only the communication failure with the earliest timestamp is processed and the remaining communication failures are left to be processed in the next $T_{active}$ seconds. As such, conflicting decisions between UAVs can be avoided, thereby enabling all UAVs to obtain consistent communication failure processing results.

Based on the communication failure diagnosis strategy described above, each UAV can obtain the same communication failure information in time, each UAV then modifies the original formation communication diagram $G=(V, E, W, P)$ so as to obtain the reconstructed formation communication diagram $G_r=(V_r, E_r, W_r, P_r)$, the details are shown as follows:

(1) When a unicast transmitter failure occurs in $UAV_j$, delete all outgoing edges of $v_j$.

(2) When a unicast receiver failure occurs in $UAV_j$, delete all ingoing edges of $v_j$.

(3) When a unicast transceiver failure or a broadcast transmitter failure or a broadcast receiver failure occurs in $UAV_j$, delete all ingoing edges and outgoing edges of $v_j$.

(4) When the link from $UAV_j$ to $UAV_k$ interrupts, delete $e_{jk}$.

In Step 5 of the algorithm, each kind of feasible UAV position configurations $P_n$ must be a permutation selecting $|V_r|$ elements from $|V|$ elements, wherein $|V|$ elements represent different positions in the formation shape respectively, i.e. they are $1, 2, \ldots, |V|$ respectively.

Therefore, the total amount of all feasible $P_n$ is $$A(|V|, |V_r|) = \frac{|V|!}{(|V|-|V_r|)!}.$$

In Step 6 of the algorithm, a special node referred to as virtual leader (VL) and the corresponding outgoing edges thereof with a specific weight are added in $G_n=(V_n, E_n, W_n, P_n)$, so as to form a new formation communication diagram $G_n'=(V_n', E_n', W_n', P_n')$, the details are shown as follows:

(1) $V_n'=\{v_0\} \cup V_n$ is a set of nodes of diagram $G_n'$, wherein $v_0$ is the virtual leader VL, it represents a virtual point in the predetermined formation reference track.

(2) $E_n'=\{e_{0k}\} \cup E_n$, $1 \leq k \leq |V_n|$ is a set of edges of diagram $G_n'$, wherein $e_{0k}$ represents that the kth UAV $UAV_k$ knows the predetermined formation reference track, i.e. $UAV_k$ is the candidate formation leader.

(3) $W_n'=\{w(e_{0k})\} | W_n$, $e_{0k} \in E_n'$ is a set of weight for each edge of diagram $G_n'$, wherein all outgoing edges of $v_0$ have the same weight $$w(e_{0k}) = \sum_{i=1}^{|V_n|}\sum_{j=1}^{|V_n|} w(e_{ij}) + 1,\ e_{ij} \in E_n,$$

i.e. $w(e_{0k})$ is 1 more than the weights sum of all edges in the original formation communication diagram $G_n$.

(4) $P_n'=P_n=\{p_i\}$, $1 \le i \le n$ is a set of specific position for each UAV in formation shape S, it is referred to as UAV position configuration, wherein $p_i$ represents the specific position of $UAV_i$ in S (particularly, $p_i=0$ represents that $UAV_i$ has left the formation).

Based on the definition of $G_n'$, the following conclusion can be drawn.

Theorem 3: If minimum cost arborescence $A_n'$ of the new formation communication diagram $G_n'$ exists and $v_0$ has only one outgoing edge, the optimal communication topology $A_n$ of the formation on the basis of the original formation communication diagram $G_n$ exists, and it is a result after deleting $v_0$ and $v_0$'s outgoing edges in $A_n'$.

In Step 9 of the algorithm, the exchange distance of a certain UAV needed by UAV position reconstruction is a euclidean distance between the original position and the new position of the UAV in the formation shape.

After the performance of the algorithm, all remaining UAVs will be switched to the reoptimized communication topology and continue to keep the formation shape. The core step of the algorithm is Step 7, wherein a faster implementation of the Edmonds algorithm proposed by Gabow et al is used. In addition, it could be seen from Step 4 of the algorithm that Step 7 can be called in loop to a maximum of $$\frac{|V|!}{(|V|-|V_r|)!}$$

times. Therefore, the computational complexity of the algorithm is $$O\left(\frac{|V|!}{(|V|-|V_r|)!} \times (|E_r'| + |V_r'| \times \log|V_r'|)\right),$$

wherein $|E_r'| \le |E|+|V|$ and $|V_r'| \le |V|+1$. Although the computational complexity of the algorithm is relatively high, since all UAVs are secure by reconstructing communication topology, the remaining UAVs can perform the algorithm with the idle time in their own flights, and the UAV position reconstruction will be conducted only when all remaining UAVs have performed the algorithm.

Compared with the existing algorithms for reoptimizing communication topology under communication failure, the algorithm has the following advantages:

(1) Possesses stronger theoretical basis, can guarantee that an optimal communication topology must be obtained by UAV position reconstruction.

(2) The algorithm is more flexible, suitable for any formation shape.

Figure 2:
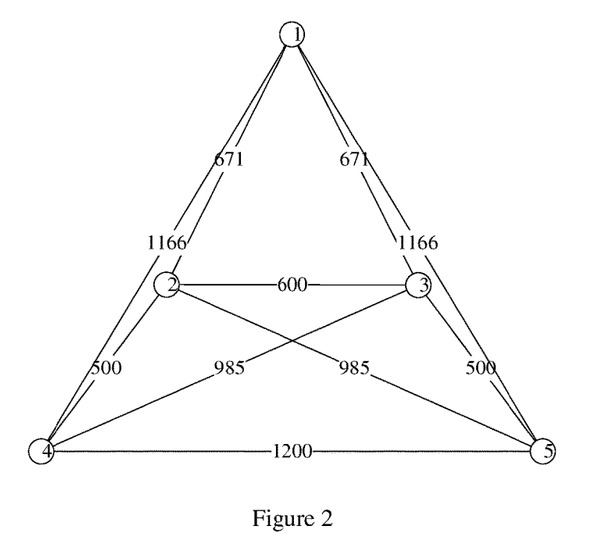
FIG. 2 is a diagram illustrating a formation shape needed to maintain by the formation provided by an embodiment of the present disclosure.

Examples are made as follows:

Assume that five UAVs fly in a wedge-shaped formation as shown in FIG. 2, all positions therein are numbered {1, 2, 3, 4, 5} respectively, each of which is at the same height and the distances between them are identified in FIG. 2. In addition, only $UAV_1$, $UAV_2$ and $UAV_4$ can be the formation leader.

Figure 3:
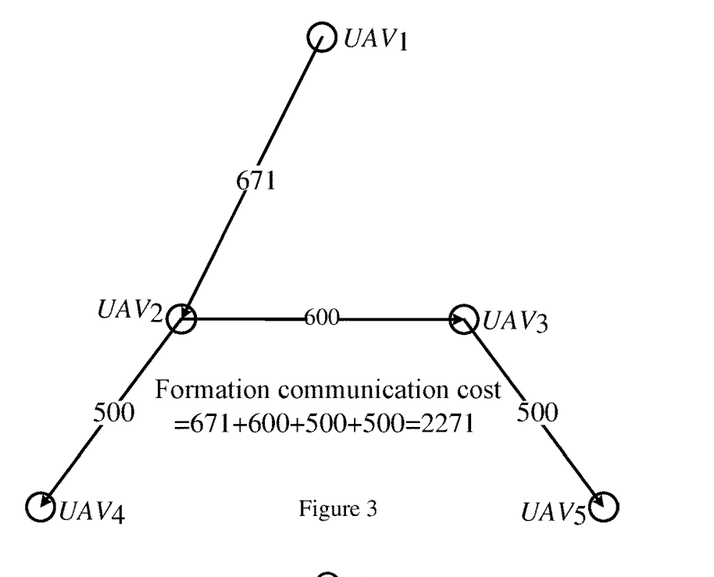
FIG. 3 is a diagram illustrating an initial optimal communication topology of the formation provided by an embodiment of the present disclosure.

FIG. 3 is an initial optimal communication topology in the absence of communication failure. Wherein $UAV_1$ is the formation leader, $UAV_2$ flies following $UAV_1$, $UAV_3$ flies following $UAV_2$, $UAV_4$ flies following $UAV_2$, $UAV_5$ flies following $UAV_3$, the formation communication cost is 2271.

Figure 4:
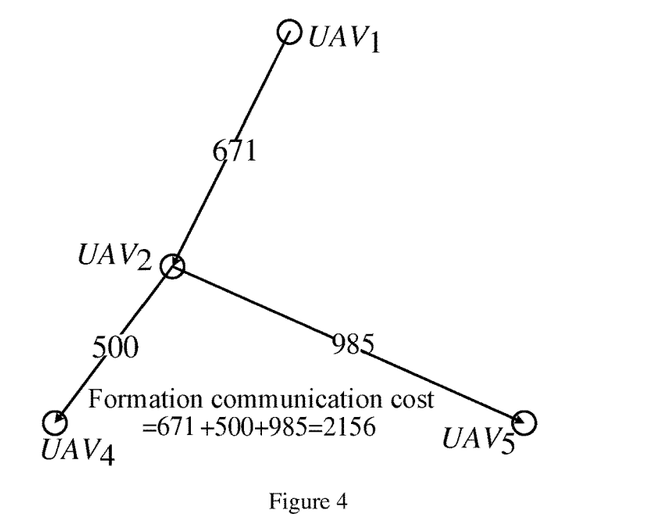
FIG. 4 is a diagram illustrating a reconstructed communication topology of the formation provided by an embodiment of the present disclosure.

FIG. 4 is a reconstructed communication topology after a unicast transceiver failure occurs on $UAV_3$. Wherein $UAV_3$ has left the formation, $UAV_1$ is the formation leader, $UAV_2$ flies following $UAV_1$, $UAV_4$ flies following $UAV_2$, $UAV_5$ flies following $UAV_2$, the formation communication cost is 2156.

Figure 5:
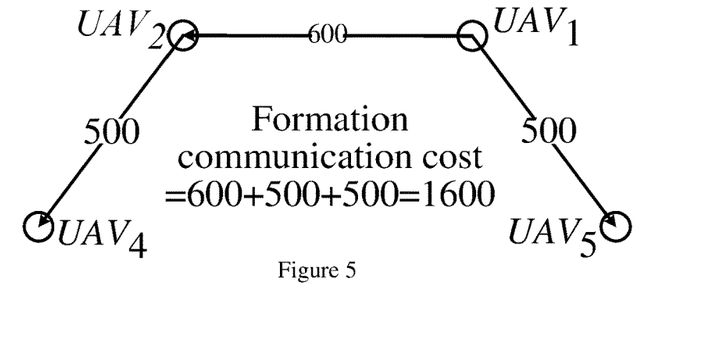
FIG. 5 is a diagram illustrating a reoptimized communication topology of the formation provided by an embodiment of the present disclosure.

FIG. 5 is a reoptimized communication topology obtained through the method of the present disclosure. Wherein $UAV_1$ occupies the vacancy left by $UAV_3$, $UAV_1$ is the formation leader, $UAV_2$ flies following $UAV_1$, $UAV_4$ flies following $UAV_2$, $UAV_5$ flies following $UAV_1$, the formation communication cost is 1600.

Figure 6:
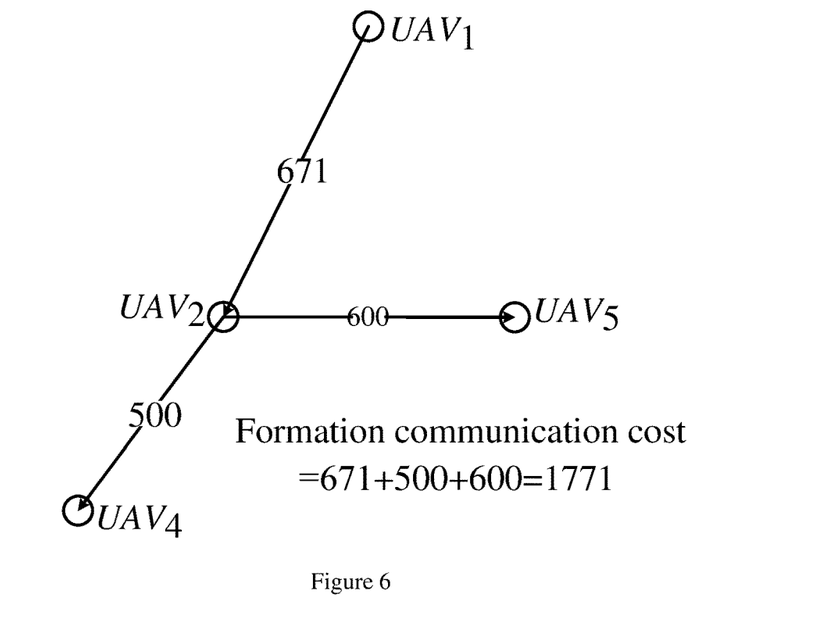
FIG. 6 is a diagram illustrating a reoptimized communication topology of the formation in the prior art.

FIG. 6 is a reoptimized communication topology obtained through the existing method. Wherein $UAV_5$ occupies the vacancy left by $UAV_3$, $UAV_1$ is the formation leader, $UAV_2$ flies following $UAV_1$, $UAV_4$ flies following $UAV_2$, $UAV_5$ flies following $UAV_2$, the formation communication cost is 1771, which is higher than the formation communication cost obtained by the method of the present disclosure.

Figure 7:
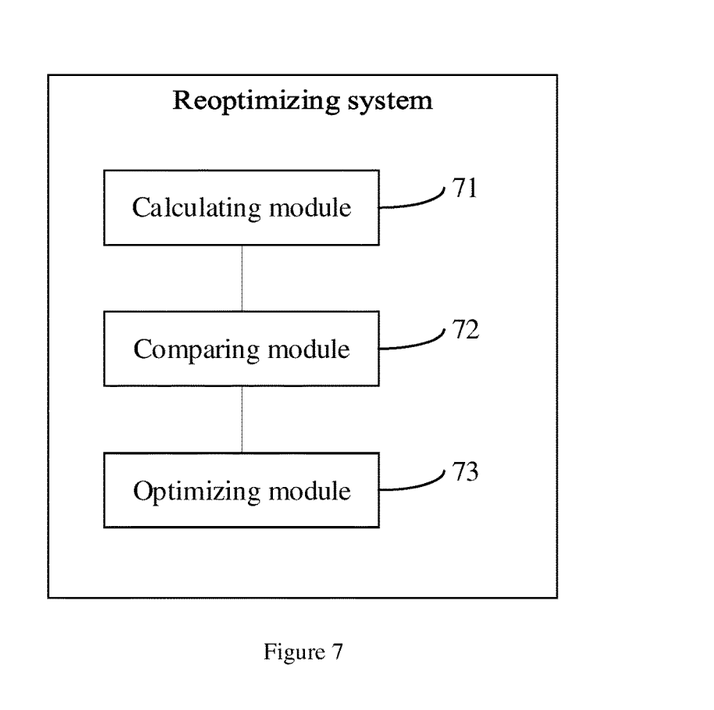
FIG. 7 is a construction diagram illustrating the system for reoptimizing unmanned aerial vehicle formation communication topology based on minimum cost arborescence according to an embodiment of the present disclosure.

FIG. 7 is a construction diagram illustrating the system for reoptimizing unmanned aerial vehicle formation communication topology based on minimum cost arborescence according to an embodiment of the present disclosure. The system is used for optimizing reconstructed UAV formation communication topology after a communication failure occurs on the UAVs in the formation, as shown in FIG. 7, the system comprises:

calculating module 71, for calculating a first communication cost of the reconstructed UAV formation communication topology;

comparing module 72, for comparing the first communication cost with a target communication cost for the minimum cost arborescence of the formation communication diagram under a predetermined state;

optimizing module 73, for optimizing the reconstructed UAV formation communication topology through a predetermined strategy, when the first communication cost is greater than the target communication cost for the minimum cost arborescence of the formation communication diagram under the predetermined state.

In a preferred implementation way of the embodiment, the optimizing module is used for:

exchanging the positions of the UAVs in the formation communication diagram for multiple times, obtaining a second communication cost for the minimum cost arborescence of the formation communication diagram in which the positions have been exchanged for multiple times;

taking the formation communication topology corresponding to the second communication cost, as the reoptimized UAV formation communication topology;

Wherein, the second communication cost is the minimum communication cost for the minimum cost arborescence of the formation communication diagram in which the positions have been exchanged for multiple times.

In a preferred implementation way of the embodiment, the optimizing module is specifically used for:

taking the first communication cost as the initial value of the second communication cost;

exchanging the positions of the UAVs in the formation communication diagram for the first time, obtaining a third communication cost;

taking the third communication cost as the optimizing value of the second communication cost if the third communication cost is smaller than the initial value of the second communication cost;

exchanging the positions of the UAVs in the formation communication diagram firstly exchanged for the second time, obtaining a fourth communication cost;

taking the fourth communication cost as the optimizing value of the second communication cost if the fourth communication cost is smaller than the optimizing value of the second communication cost;

exchanging the positions of the UAVs in the formation communication diagram secondly exchanged for the Nth time, obtaining a fifth communication cost;

taking the fifth communication cost as the optimizing value of the second communication cost if the fifth communication cost is smaller than the optimizing value of the second communication cost.

In a preferred implementation way of the embodiment, the optimizing module is specifically used for:

comparing the exchange times and exchange distances for the UAV positions of the UAV formation communication topologies corresponding to the fifth communication cost and to the optimizing value of the second communication cost with respect to the reconstructed UAV formation communication topology respectively, if the fifth communication cost is equal to the optimizing value of the second communication cost;

taking the fifth communication cost as the optimizing value of the second communication cost, if the exchange times and exchange distances for the UAV positions of the UAV formation communication topology corresponding to the fifth communication cost are smaller;

In a preferred implementation way of the embodiment, the formation communication diagram under the predetermined state is: any one of the UAVs in the communication diagram may be the formation leader and all the UAVs communicate normally with each other.

It needs to be noted that the above-described system is in a one-to-one relationship with the above-described method. The implementation details of the above-described method are equally applicable to the above-described system, and the above-described system will not be described in detail once again in the embodiment.

A number of specific details are set forth in the specification of the present disclosure. However, it will be appreciated that embodiments of the present disclosure may be practiced without these specific details. In some embodiments, the well-known methods, structures, and techniques have not been shown in detail so as not to obscure the understanding of this specification.

Similarly, it should be understood that in order to simplify the present disclosure and to assist in understanding one or more of the various aspects of the present disclosure, each of the features of the present disclosure is sometimes grouped together into a single embodiment, a figure, or a description thereof. However, the methods of this disclosure should not be explained to reflect the intent that, the claimed present disclosure claims features more than those specifically cited in each claim. To be more specifically, as reflected in the following claims, the inventive aspect is less than all the features of the previously disclosed single embodiment. Accordingly, the claims that follow the specific embodiments are expressly incorporated into this particular embodiment, each of which is a separate embodiment of the disclosure.

It will be appreciated by those skilled in the art that the modules in the devices in the embodiments may be adaptively changed and placed in one or more of the devices that are different to the embodiments. The modules or units or components in the embodiments may be combined into one module or unit or component, and in addition they may be divided into a plurality of submodules or subunits or subcomponents. In addition to the fact that at least some of the features and/or processes or units are mutually exclusive, any combination could be applied with respect to all the features disclosed in this specification (including the accompanying claims, abstract and drawings), and all the processes or units of any method or device disclosed as such. Unless otherwise expressly stated, each feature disclosed in this specification (including the accompanying claims, abstract and drawings) may be replaced by alternative features that provide the same, equivalent or similar purpose.

Besides, it will be understood by those skilled in the art that although some of the embodiments described herein include certain features included in other embodiments and are not other features, combinations of features from different embodiments are meant to be within the scope of the disclosure and form different embodiments. For example, in the following claims, any one of the claimed embodiments may be used in any combination.

Each component embodiment of the present disclosure may be implemented in hardware, or implemented as software modules running on one or more processors, or implemented in a combination thereof. It will be appreciated by those skilled in the art that some or all of the functions of some or all of the components with the devices of a browser terminal according to an embodiment of the present disclosure may be implemented in practice using a microprocessor or a digital signal processor (DSP). The present disclosure may also be implemented as a part or all of the devices or device programs (e.g., computer programs and computer program products) for performing the methods described herein. Such a program for implementing the present disclosure may be stored in a computer-readable medium or may have a form of one or more signals. Such signals may be downloaded from the Internet website, or provided on a carrier signal or in any other form.

It is to be noted that the above-described embodiments illustrate the disclosure but not limit the disclosure, and alternative embodiments could be designed by the person skilled in the art without departing from the scope of the appended claims. In the claims, any reference sign between parentheses should not be construed as limiting the claims. Word "comprise" does not exclude the presence of elements or steps not listed in the claims. Word "a" or "one" in front of elements does not exclude the presence of a plurality of such elements. The present disclosure may be implemented with the help of hardware comprising several different elements and with the help of a suitably programmed computer. In the unit claims listing several devices, some of these devices may be specifically implemented by a same hardware item. The use of the "first", "second", and "third" do not indicate any order. These words can be construed as names.

Finally, it should be noted that each of the embodiments above is only used for describing rather than limiting the present disclosure; although the present disclosure has been described in detail with reference to each foregoing embodiment, it should be understood by those of ordinary skill in the art that it is still possible to modify the technical solutions described in the foregoing embodiments, or to equivalently substitute some or all of the technical features therein; and these modifications or substitutions do not separate the essence of corresponding technical solutions from the scope of the technical solutions within each embodiment of the present disclosure, they are intended to be included within the scope of the claims and the description of the present disclosure.

The invention claimed is:

1. A method for reoptimizing an unmanned aerial vehicle (UAV) formation communication topology diagram based on a minimum communication cost arborescence, comprising:
reconstructing a UAV formation communication topology diagram after a communication failure occurs on UAVs configured in a formation, while maintaining the formation of the UAVs;
calculating a first communication cost of the reconstructed UAV formation communication topology diagram;
comparing the first communication cost with a target communication cost for a minimum communication cost arborescence of a formation communication diagram under a predetermined state; and
optimizing the reconstructed UAV formation communication topology diagram through a predetermined strategy if the first communication cost is greater than the target communication cost for the minimum communication cost arborescence of the formation communication diagram under the predetermined state,
wherein optimizing the reconstructed UAV formation communication topology diagram through the predetermined strategy comprises:
exchanging positions of the UAVs in the formation communication diagram for multiple times while filling up a vacancy of a first UAV that leaves the formation of the UAVs with a second UAV and maintaining (1) the formation of the UAVs and (2) a same communication cost between the positions of the UAVs after the first UAV is replaced with the second UAV as before the replacement, obtaining a second communication cost for the minimum communication cost arborescence of the formation communication diagram in which the positions have been exchanged for multiple times; and
taking the formation communication topology diagram corresponding to the second communication cost, as the reoptimized UAV formation communication topology diagram,
wherein, the second communication cost is the minimum communication cost for the minimum communication cost arborescence of the formation communication diagram in which the positions have been exchanged for multiple times.

2. The method according to claim 1, wherein exchanging the positions of the UAVs in the formation communication diagram for multiple times, obtaining a second communication cost for the minimum communication cost arborescence of the formation communication diagram in which the positions have been exchanged for multiple times comprise:
taking the first communication cost as the initial value of the second communication cost;
exchanging the positions of the UAVs in the formation communication diagram for the first time, obtaining a third communication cost;
taking the third communication cost as the optimizing value of the second communication cost, if the third communication cost is smaller than the initial value of the second communication cost;
exchanging the positions of the UAVs in the formation communication diagram firstly exchanged for the second time, obtaining a fourth communication cost;
taking the fourth communication cost as the optimizing value of the second communication cost, if the fourth communication cost is smaller than the optimizing value of the second communication cost;
exchanging the positions of the UAVs in the formation communication diagram secondly exchanged for the Nth time, obtaining a fifth communication cost;
taking the fifth communication cost as the optimizing value of the second communication cost, if the fifth communication cost is smaller than the optimizing value of the second communication cost.

3. The method according to claim 2, wherein exchanging the positions of the UAVs in the formation communication diagram for multiple times, obtaining a second communication cost for the minimum communication cost arborescence of the formation communication diagram in which the positions have been exchanged for multiple times comprise:
comparing the exchange times and exchange distances for the UAV positions of the UAV formation communication topology diagrams corresponding to the fifth communication cost and to the optimizing value of the second communication cost with respect to the reconstructed UAV formation communication topology diagram respectively, if the fifth communication cost is equal to the optimizing value of the second communication cost;
taking the fifth communication cost as the optimizing value of the second communication cost, if the exchange times and exchange distances for the UAV positions of the UAV formation communication topology diagram corresponding to the fifth communication cost are smaller.

4. The method according to claim 1, wherein the formation communication diagram under the predetermined state is: any one of the UAVs in the communication diagram may be the formation leader and all the UAVs communicate normally with each other.

5. A system for reoptimizing an unmanned aerial vehicle (UAV) formation communication topology diagram based on minimum communication cost arborescence, comprising:
one or more processors; a memory; and one or more modules stored in the memory, the one or more modules are configured to perform the following operations when being executed by the one or more processors:
reconstructing a UAV formation communication topology diagram after a communication failure occurs on UAVs configured in a formation, while maintaining the formation of the UAVs;
calculating a first communication cost of the reconstructed UAV formation communication topology diagram;
comparing the first communication cost with a target communication cost for the minimum cost arborescence of a formation communication diagram under a predetermined state;
optimizing the reconstructed UAV formation communication topology diagram through a predetermined strategy if the first communication cost is greater than the target communication cost for the minimum communication cost arborescence of the formation communication diagram under the predetermined state;
the processor is further configured to perform the following:

exchanging positions of the UAVs in the formation communication diagram for multiple times while filling up the vacancy of a first UAV that leaves the formation of the UAVs with a second UAV and maintaining (1) the formation of the UAVs and (2) a same communication cost between the positions of the UAVs after the first UAV is replaced with the second UAV as before the replacement, obtaining a second communication cost for the minimum communication cost arborescence of the formation communication diagram in which the positions have been exchanged for multiple times;

taking the formation communication topology diagram corresponding to the second communication cost, as the reoptimized UAV formation communication topology diagram;

wherein, the second communication cost is the minimum communication cost for the minimum cost arborescence of the formation communication diagram in which the positions have been exchanged for multiple times.

6. The system according to claim 5, wherein the processor is further configured to perform the following steps:

taking the first communication cost as the initial value of the second communication cost;

exchanging the positions of the UAVs in the formation communication diagram for the first time, obtaining a third communication cost;

taking the third communication cost as the optimizing value of the second communication cost if the third communication cost is smaller than the initial value of the second communication cost;

exchanging the positions of the UAVs in the formation communication diagram firstly exchanged for the second time, obtaining a fourth communication cost;

taking the fourth communication cost as the optimizing value of the second communication cost if the fourth communication cost is smaller than the optimizing value of the second communication cost;

exchanging the positions of the UAVs in the formation communication diagram secondly exchanged for the Nth time, obtaining a fifth communication cost;

taking the fifth communication cost as the optimizing value of the second communication cost if the fifth communication cost is smaller than the optimizing value of the second communication cost.

7. The system according to claim 5, wherein the processor is further configured to perform the following steps:

comparing the exchange times and exchange distances for the UAV positions of the UAV formation communication topology diagrams corresponding to the fifth communication cost and to the optimizing value of the second communication cost with respect to the reconstructed UAV formation communication topology diagram respectively, if the fifth communication cost is equal to the optimizing value of the second communication cost;

taking the fifth communication cost as the optimizing value of the second communication cost, if the exchange times and exchange distances for the UAV positions of the UAV formation communication topology diagram corresponding to the fifth communication cost are smaller.

8. The system according to claim 5, wherein the formation communication diagram under the predetermined state is: any one of the UAVs in the communication diagram may be the formation leader and all the UAVs communicate normally with each other.

* * * * *

UNITED STATES PATENT AND TRADEMARK OFFICE
CERTIFICATE OF CORRECTION

PATENT NO. : 10,271,239 B2
APPLICATION NO. : 15/608571
DATED : April 23, 2019
INVENTOR(S) : Wang et al.

Page 1 of 1

It is certified that error appears in the above-identified patent and that said Letters Patent is hereby corrected as shown below:

On the Title Page

Item (12) "Luo, et al." should read -- Wang, et al. --.

Item (72) Inventor is corrected to read:
-- Guoqiang Wang, Anhui Province (CN);
He Luo, Anhui Province (CN);
Xiaoxuan Hu, Anhui Province (CN);
Huawei Ma, Anhui Province (CN);
Peng Jin, Anhui Province (CN);
Wei Xia, Anhui Province (CN) --.

Signed and Sealed this
Thirteenth Day of August, 2019

Andrei Iancu
*Director of the United States Patent and Trademark Office*